Aug. 16, 1927.
W. C. GLOVER
1,639,373
APPARATUS FOR RECLAIMING USED GASOLINE
Original Filed Oct. 23, 1922
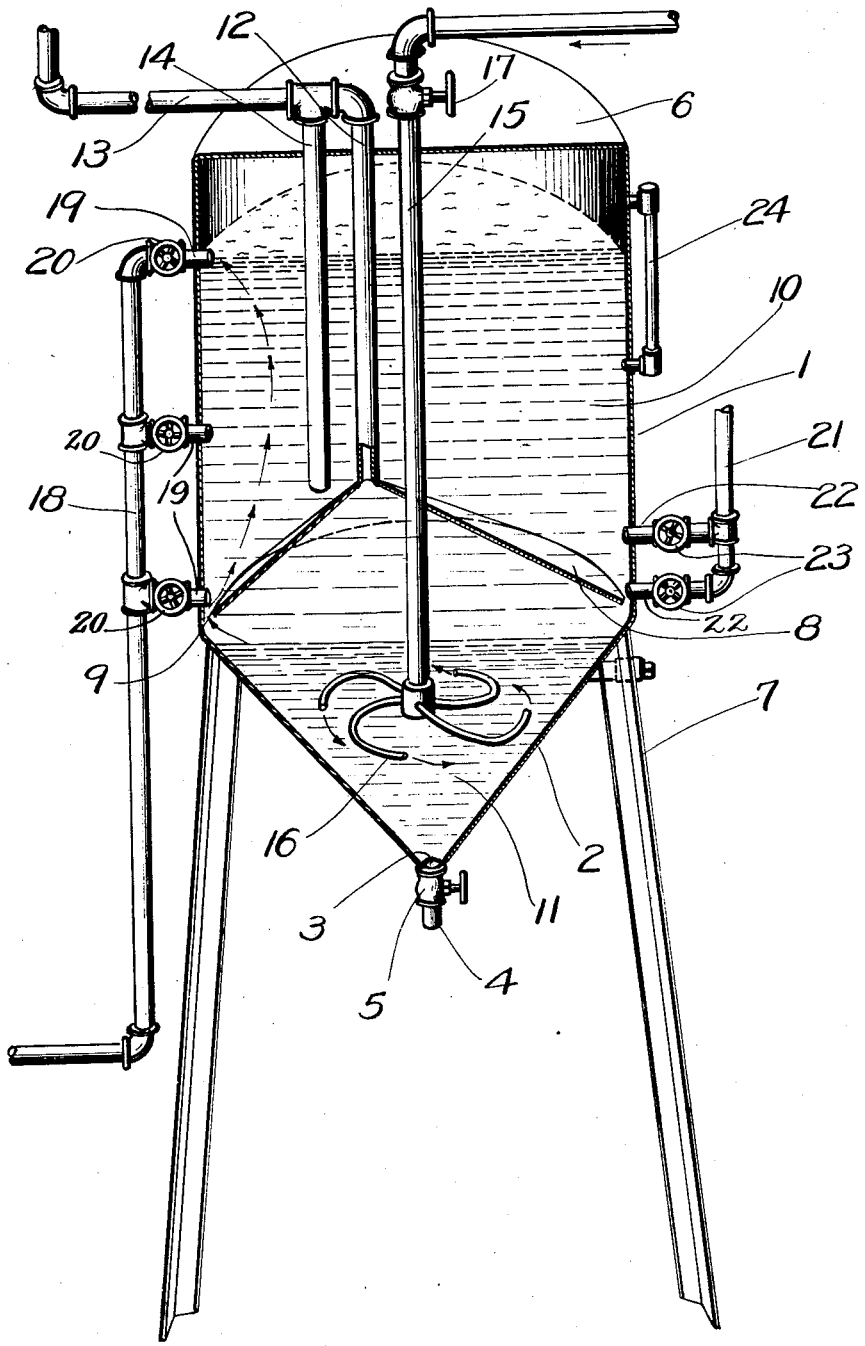
INVENTOR
William C. Glover
BY
ATTORNEY Patented Aug. 16, 1927.

1,639,373

UNITED STATES PATENT OFFICE.

WILLIAM C. GLOVER, OF KANSAS CITY, MISSOURI.

APPARATUS FOR RECLAIMING USED GASOLINE.

Original application filed October 23, 1922, Serial No. 596,446. Divided and this application filed January 21, 1926. Serial No. 82,759.

My invention relates to clarifiers and more particularly to those adapted for use in closed cleaning systems of the type shown and described in my co-pending application, Serial No. 596,446, of which this application is a division.

In systems of this general type, clothing or the like is cleaned within a washer by means of gasoline continuously flowing through the washer and through purifying apparatus, wherein dirt and other foreign matter accumulated in the washer is removed from the gasoline to reclaim the gasoline for further use in the washer.

While purification of the gasoline can be effected by filtration and settling, filtration alone is not sufficient, as it does not remove small particles of dirt nor the grease, and the filters soon become clogged with lint and cease to operate. Settling is effective, but requires more time than is available in the use of continuous systems.

Consequently, it is desirable as a step of the cleaning process to facilitate precipitation of particles of dirt by passing the gasoline through a chemical bath and retarding and quieting flow from the bath to facilitate precipitation and avoid redistribution of the foreign matter through the cleaning liquid.

It is the object of the present invention to provide a clarifier having the advantages above enumerated and which is simple and economical in construction and operation.

In accomplishing this object I have provided improved details of structure, the preferred forms of which are illustrated in the accompanying drawing, the single figure of which is a perspective view of a clarifier embodying my improvements, the clarifier tank being in central, vertical section.

Referring more in detail to the drawing, 1 designates a tank of any suitable size and material to adapt it to the system with which it is employed, the body of the tank being preferably cylindrical and the bottom in the shape of an inverted cone 2, having an outlet port 3 at its apex communicating with an offtake pipe 4 provided with a control valve 5. The top 6 of the tank is preferably permanently closed. While the tank may be supported in any suitable manner at the proper point in the system in connection with which it is to be used, I prefer that it be on legs 7 of angle iron, although the detail construction of the tank and its mounting is not material to the invention.

Located within the tank and rising from immediately above the base of the bottom 2 is a baffle 8 of conical formation, with its apex set to one side of the center of the tank to permit extension of the vent pipe from the apex of the cone without interference with location of the supply pipe centrally of the tank, the edge of the baffle being slightly inset from the wall of the tank to provide an annular opening 9 through which liquid may rise, the baffle dividing the interior of the tank into upper and lower chambers 10 and 11, the only means of communication between which is the annular opening 9. The baffle may be supported by any suitable means, but is preferably suspended from a vent pipe 12 which extends through the top of the tank and through the upper chamber and is connected with the bottom at the apex of the cone, so that any air trapped within the lower chamber 11 may be vented to atmosphere through the pipe 12.

The pipe 12 extends vertically within the tank and is turned horizontally thereabove, the horizontal portion 13 having a return branch 14 leading back into the upper tank chamber 10 and terminating above the baffle so that any liquid condensing out of the air drawn over from the tank through the vent pipe may flow back into the upper tank chamber at a depth to avoid agitation of the liquid in the chamber.

Extending through the tank and through the baffle 8 is a supply pipe 15 which leads to near the bottom of the lower tank chamber 10 and is there provided with curved nozzles 16, all opening in the same direction to discharge liquid from the supply pipe in a circular path to set up a swirling action within the lower tank chamber and thereby facilitate distribution of the gasoline through the chemical bath hereinafter mentioned. The supply pipe 15 may lead from any suitable source, but as heretofore suggested, preferably draws dirty gasoline from a washer either directly or through other elements, including a pump (not shown).

The supply pipe is preferably provided adjacent the tank with the valve 17 whereby flow to the tank may be controlled.

Opening to the upper tank chamber is an outlet pipe 18 through which purified gasoline may be drawn off for re-use, the connection of the pipe with the tank being preferably through a plurality of vertically spaced branches 19 each controlled by a valve 20, the multiple outlet being provided in order that gasoline may be drawn from the highest possible points within the tank for the reason that because of precipitation as the liquid rises in the tank, the clearest liquid is at the highest level.

As heretofore explained, it is customary to supply clarifiers of this type with a chemical bath through which the dirty gasoline is initially passed to hasten precipitation. Caustic soda is the chemical usually employed. This may be supplied in solution through a pipe 21 having branches 22 leading though the wall of the tank directly above the baffle and controlled by valves 23 so that the chemical solution may be flowed into the lower portion of the tank where it settles in a bed, rising to about the top of the conical bottom and submerging the distributor nozzles on the supply pipe.

24 designates a gauge on the tank whereby the level of the contained liquid may be observed.

In using the clarifier, assuming that it is constructed as described, and assembled as an element of a closed cleaning system or otherwise, the operation is as follows:

The caustic soda having been supplied in solution to the lower chamber of the tank, dirty gasoline is flowed through the supply pipe and delivered through the discharge nozzles in a circular path which, supplemented by contact with the conical bottom of the tank, causes the gasoline to swirl within the tank and effect a thorough distribution through the chemical, so that the entire volume of the gasoline may be affected by the chemical solution.

It is important that there be an agitation of the liquid within the lower chamber of the tank in order that all of the liquid may be affected by the chemical solution. It is just as important that agitation of the liquid be avoided in the upper chamber of the tank in order that foreign matter may precipitate from the liquid to produce a clear, clean product for re-use in the washer. It is for quieting the agitation and confining it to the lower chamber that I provide the baffle forming part of my device. It is apparent that with my construction, outlet of the gasoline from the lower chamber to the upper one is only through the narrow annular opening between the baffle and the wall of the tank, the swirl within the lower chamber being quieted by restriction of the outlet and the change of path so that foreign matter including the chemical which is carried forward with the liquid, settles or precipitates from the gasoline during rise of the latter in the upper chamber of the tank.

By confining offtake of the liquid to the higher levels of the supply in the tank, only that gasoline which has had the greatest opportunity for clarification is taken, the branches 19 being selectively operated as level of the liquid within the tank is lowered.

It is impossible, of course, to prevent air coming over with the dirty gasoline and unless some provision were made for other disposition of the air it would rise through the liquid in bubbles, carrying an agitation through the upper quantity of liquid and interfering with the settling and precipitation. With my apparatus, however, practically all of the air entering the lower chamber is trapped within the conical pocket formed by the baffle, and is relieved or vented through the pipe 12 so that very little if any of the air reaches the annular opening 9 through which the liquid is passed from the lower to the upper chamber. The vented air is naturally saturated with the gasoline and as the saturated air travels in the vent pipe, the liquid condenses. As the condensation itself constitutes a purifying action, I arrange to return the condensed liquid to the upper chamber rather than to the lower one, and to provide ample opportunity for the condensation I extend the pipe 12 horizontally for part of its extent so that liquid condensing in the pipe may collect in the horizontal section and flow back to the return pipe 14 through which it is delivered into the upper chamber.

Any impurities heavier than the dirty gasoline flowing back with the condensed liquid are delivered on to the conical top of the baffle and passing down the inclined surface, are delivered through the opening 9 to the lower chamber of the tank.

As use of chemicals for clarifying gasoline is well known and as my improvements relate to the mechanical construction for facilitating the clarification rather than to the action of the chemical on the liquid, I will not describe the use of the clarifier more in detail, except to say that impurities from the gasoline collected in the conical bottom of the tank may be drawn off from time to time as may be desired.

It is apparent that with my construction purification of the gasoline is rapid and effective, and therefore, well adapted for use in a continuous or closed cleaning system.

What I claim and desire to secure by Letters-Patent is:—

1. In an apparatus for reclaiming used gasoline, a gasoline clarifying tank, a baffle located in said tank and adapted to afford communication between the upper and lower portions thereof, means for delivering used gasoline to the lower portion of the tank, means for drawing off clarified gasoline from the upper portion of the tank, and an air vent pipe leading from the lower portion of the tank to the exterior thereof.

2. In an apparatus for reclaiming used gasoline, a gasoline clarifying tank, a conical baffle located in said tank and spaced from the wall thereof to afford communication between the upper and lower portions thereof, means for delivering used gasoline to the lower portion of the tank, means for drawing off clarified gasoline from the upper portion of the tank, and an air vent pipe leading from the upper part of the lower portion of the tank to the exterior thereof.

3. In an apparatus for reclaiming used gasoline, a gasoline clarifying tank, a conical baffle located in said tank and adapted to afford communication between the upper and lower portions thereof, means for delivering used gasoline to the lower portion of the tank, means for drawing off clarified gasoline from the upper portion of the tank, and an air vent conduit leading from the apex of the conical baffle to the exterior of the tank.

4. In an apparatus for reclaiming used gasoline, a gasoline clarifying tank, a baffle located in said tank and adapted to afford communication between the upper and lower portions thereof, means for delivering used gasoline to the lower portion of the tank, means for drawing off clarified gasoline from the upper portion of the tank, and means for venting air from beneath the baffle to the exterior of the tank.

5. In an apparatus for reclaiming used gasoline, a gasoline clarifying tank, a baffle located in said tank and spaced from the wall thereof to afford communication between the upper and lower portions thereof, means for delivering used gasoline to the lower portion of the tank, means for drawing off clarified gasoline from the upper portion of the tank, an air vent pipe leading from the lower portion of the tank to the exterior of the tank, and a pipe leading from the vent pipe back to the tank for returning condensed gasoline to the tank.

6. In an apparatus for reclaiming used gasoline, a gasoline clarifying tank, a baffle located in said tank and spaced from the wall of the tank to afford communication between the upper and lower portions of the tank, means for delivering used gasoline to the lower portion of the tank, means for drawing off clarified gasoline from the upper portion of the tank, an air vent pipe leading from the lower portion of the tank to the exterior of the tank, and a pipe leading from the vent pipe back to said upper portion of the tank for returning condensed gasoline to the tank.

7. In an apparatus for reclaiming used gasoline, a gasoline clarifying tank, a baffle having an apex located in said tank and spaced from the wall thereof to afford communication between the upper and lower portions of the tank, means for delivering used gasoline to the lower portion of the tank, means for drawing off clarified gasoline from the upper portion of the tank, a pipe leading from the apex of the baffle to the exterior of the tank for venting air from beneath the baffle, and a return pipe for condensed gasoline leading from the vent pipe back into the tank.

8. In an apparatus for reclaiming used gasoline, a gasoline clarifying tank, a baffle having an apex located in said tank and spaced from the wall thereof to afford communication between the upper and lower portions of the tank, a supply pipe leading through the baffle to the lower portion of the tank, an air vent pipe leading from the apex of the baffle to the exterior of the tank, and a condensed gasoline return pipe leading back from the vent pipe to said upper portion of the tank.

9. In an apparatus for reclaiming used gasoline, a gasoline clarifying tank having an inverted conical bottom and an offtake pipe leading from the apex of said bottom, an eccentric conical baffle located in said tank and spaced from the wall of the tank to provide communication between the upper and lower portions of the tank, a supply pipe leading through the upper portion of the tank and through the baffle into the lower portion of the tank, a distribution nozzle on the lower end of the supply pipe, a vent pipe leading from the apex of the baffle to the exterior of the tank for venting air from beneath the baffle, a pipe leading back from the vent pipe to the tank for returning condensed gasoline to the tank, and means for drawing off clarified gasoline from the upper portion of the tank.

In testimony whereof I affix my signature.

WILLIAM C. GLOVER.